UNITED STATES PATENT OFFICE.

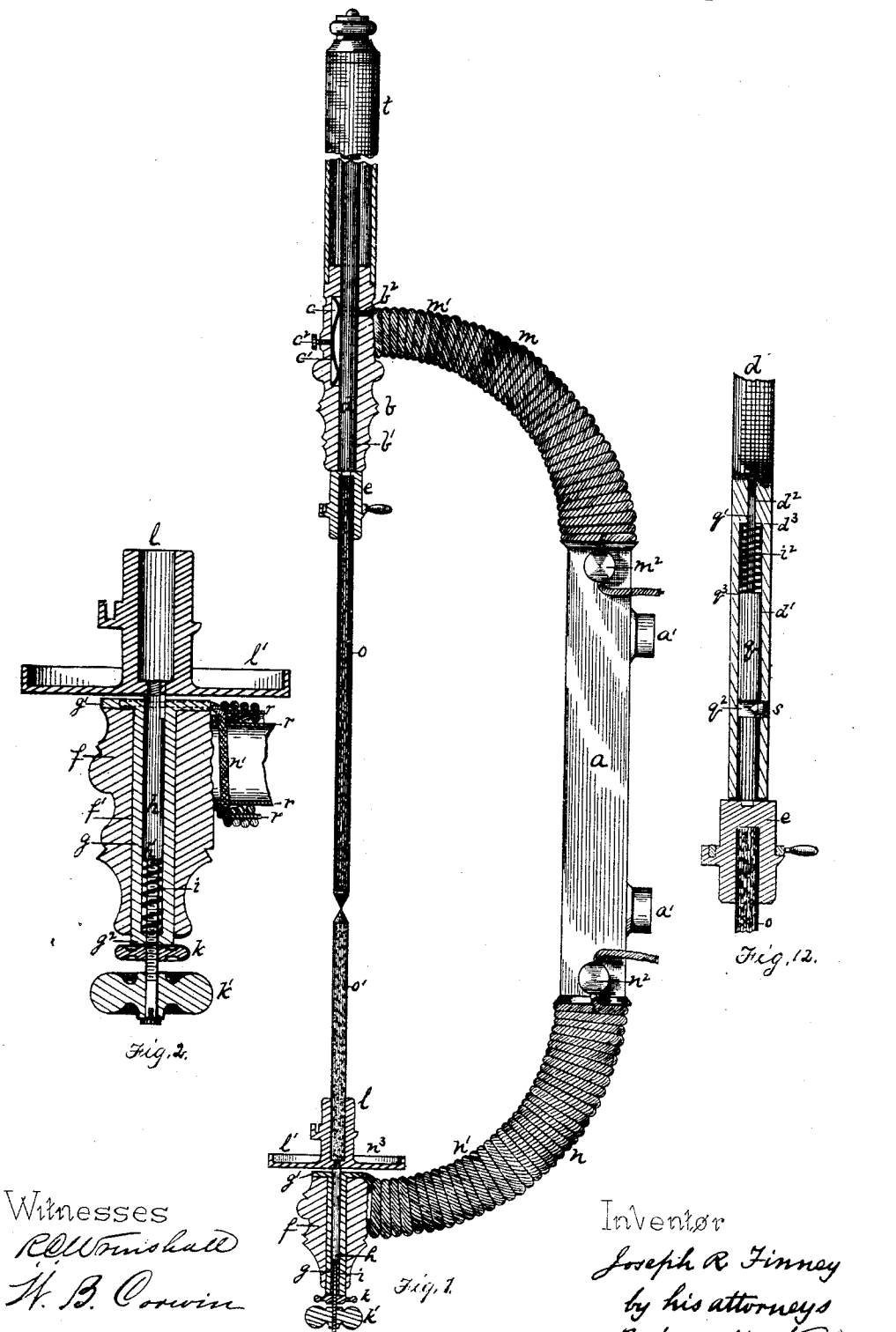

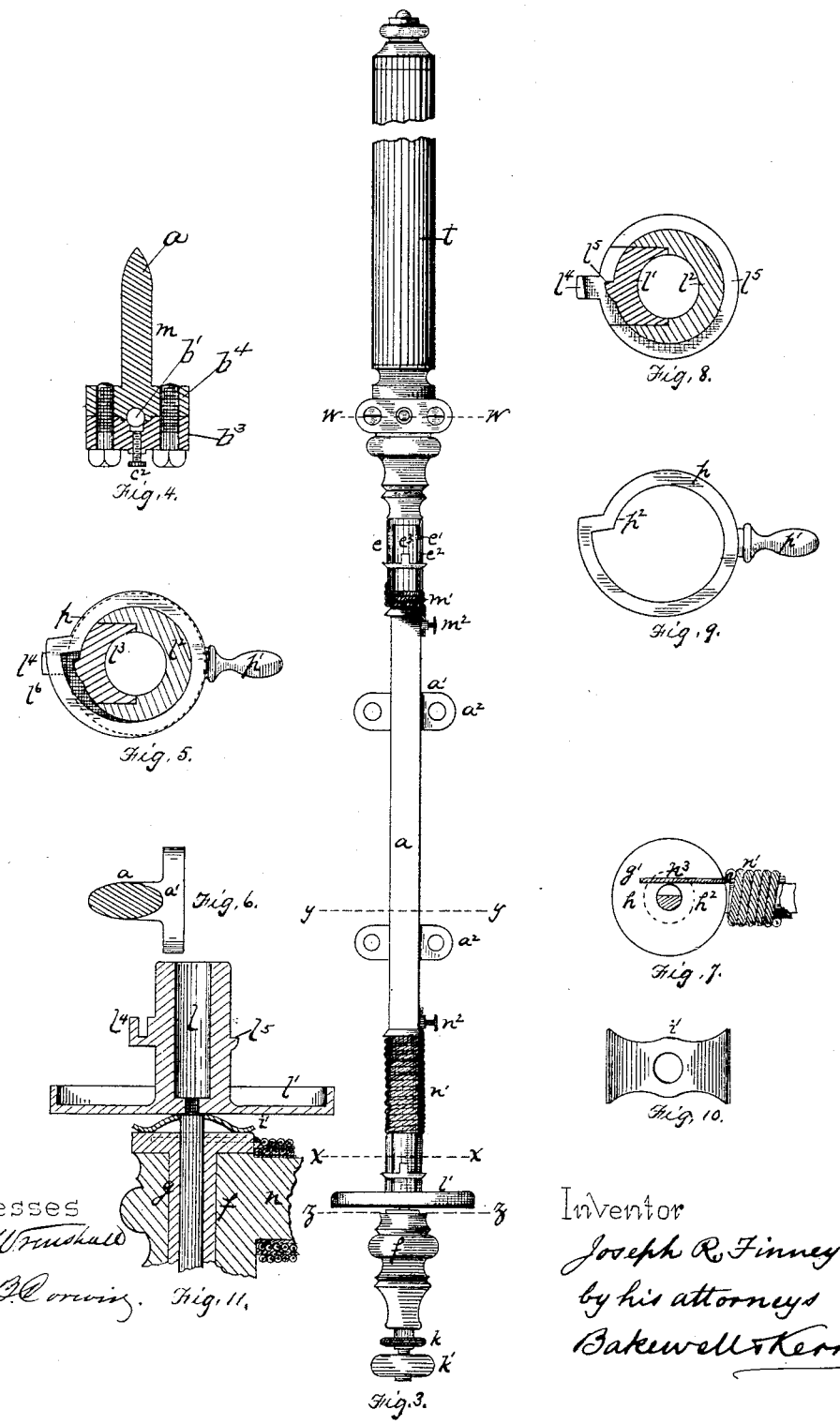

JOSEPH R. FINNEY, OF PITTSBURG, PENNSYLVANIA.

ELECTRIC-ARC LAMP.

SPECIFICATION forming part of Letters Patent No. 265,049, dated September 26, 1882.

Application filed May 3, 1882. (No model.)

*To all whom it may concern:*

Be it known that I, JOSEPH R. FINNEY, of Pittsburg, in the county of Allegheny and State of Pennsylvania, have invented a new and useful Improvement in Electric-Arc Lamps; and I do hereby declare the following to be a full, clear, and exact description thereof, reference being had to the accompanying drawings, forming a part of this specification, in which—

Figure 1 is a side elevation, partly in section, of my improved arc-lamp. Fig. 2 is an enlarged vertical section of the lower end of the lamp. Fig. 3 is a front elevation. Fig. 4 is an enlarged cross-section on the line $w\ w$ of Fig. 3. Fig. 5 is an enlarged section on $x\ x$. Fig. 6 is enlarged section on $y\ y$. Fig. 7 is an enlarged section on $z\ z$. Figs. 8 and 9 are plan views of the clamp and clamping-yoke of the lower carbon. Figs. 10 and 11 show a modification of the construction shown in Fig. 2. Fig. 12 is a modified construction of the upper-carbon rod.

Like letters of reference indicate like parts.

The frame or bracket $a$ is made of iron, and is provided with lugs $a'$, having bolt or screw holes $a^2$, by which it may be fastened to a post, wall, or other support. At the upper end of the bracket is a sleeve, $b$, which is composed of two parts divided vertically and secured together by screws, as shown in Fig. 4, the front piece, $b^3$, being composed of brass or other diamagnetic metal, and the back piece, $b^4$, which is connected to or forms part of the bracket $a$, of iron, so as to form one pole of the electro-magnet, of which the iron-frame $a$, as hereinafter described, is the core. Extending vertically through the sleeve $b$ there is a hole, $b'$, for the rod which holds the upper carbon. At one side of the hole $b'$ is a recess, $c$, containing a spring, $c'$, which bears against the upper-carbon rod $d$, and the tension of this spring is regulated by a temper-screw, $c^2$. The upper-carbon rod $d$ is a smooth iron rod of a diameter which permits it to slide easily in the hole or bore $b'$, and at its lower end it carries the carbon-clamp $e$, which is fastened to it by a screw or otherwise. At the lower end of the bracket is a sleeve, $f$, extending vertically through which, in a line with the hole $b'$ in the sleeve $b$, is a hole, $f'$. A tube, $g$, of wood or other insulating material, lines the hole $f''$, and has a lateral flange, $g'$, at its upper end, which covers the upper end of the sleeve $f$, and at the lower end its bore is reduced by an inward flange, $g^2$. Inside of the tube $g$ is a metallic (preferably brass) rod, $h$, which moves easily therein. Near the lower end of the tube $g$ the rod $h$ is reduced in diameter and has a shoulder, $h'$. Around the rod $h$, and between the shoulder $h'$ and the flange $g^2$, is a spiral spring, $i$, which sustains the rod. The lower end of the rod $h$ is screw-threaded, and is fitted with a nut, $k$, for regulating the tension of the spring $i$, and a thumb-piece, $k'$, fixed upon it for the purpose of turning it.

Attached to the upper end of the rod $h$ is the lower-carbon holder $l$, which has an iron shade-holder, $l'$. The upper and lower arms, $m$ and $n$, of the bracket $a$ are wrapped with covered wire $m'$ and $n'$, so as to make an electro-magnet of the frame. One end of the coil $m'$ is connected to a binding-screw, $m^2$, and the other end is inserted into a hole, $b^2$, in the upper sleeve, $b$. One end of the coil $n'$ is connected to a binding-screw, $n^2$, and the other end is fastened in the upper flange, $g'$, of the insulator $g$, and is in electrical contact with the rod $h$. One of the poles of the dynamo-electric machine or producer is connected by a wire to the binding-screw $m^2$ and the other pole to the binding-screw $n^2$. The coils $m'$ and $n'$ are further insulated from the bracket by a wrapping, $r$, of muslin and shellac or other suitable material, placed between them, and the binding-screws $m^2$ and $n^2$ are also insulated from the bracket. The rod $h$ of the lower-carbon holder is completely insulated from the bracket by the tube $g$, and is in electrical connection with the end of wire of the coil $n'$, which is embedded in or lies upon the top of the flange $g$, as at $n^3$, in such a position as to be in contact with the periphery of the rod $h$. The latter is recessed at one side, as at $h^2$, so that when the recessed side is turned toward the wire $n^3$, as in Fig. 7, it does not touch it, and the electrical contact is broken. When the rod is turned so as to bring its full or uncut side toward the wire it comes in contact therewith and the circuit is closed. The rod $h$ is turned by means of the button $k$. The carbons are shown at $o\ o'$.

The carbon-clamps $e$ and $l$ are of similar form. Figs. 5, 8, and 9 are views of the lower holder, $l$. It has a tubular body, $l^2$, a loose or removable side, $l^3$, a hook, $l^4$, and a flange, $l^5$. There is a circular wedge or projection, $l^6$, on the removable side $l^3$. A metallic ring or collar, $p$, having a projecting pin or handle, $p'$, and a conchoidal inner edge, $p^2$, is placed around the tubular body $l^2$, and rests upon the hook $l^4$ and flange $l^5$. If the collar is turned around from right to left, the inner edge, $p^2$, acting on the projection $l^6$, will force the loose piece $l^3$ inward and clamp it tightly against the carbon. The upper clamp, $e$, differs from the lower one only in that it has a projection, $e'$, on the removable side, which extends into a recess in the body $e^2$, or vice versa, to prevent the piece $e^3$ from falling down.

The operation of my improved lamp is as follows: The circuit being open, the iron bracket $a$ is non-magnetic, and the rods of the carbon-holders move freely within their sockets. This permits the spring $i$ to throw the lower rod, $h$, up to its full height, and the upper rod, $d$, to slip down until the carbons meet. The current, being then closed, immediately magnetizes the bracket $a$. This causes the upper rod, $d$, to be held firmly in position, and the iron holder $l$ to be drawn down against the power of the spring $i$, separating the carbons and establishing the arc. As the carbons burn off the strength of the current diminishes, and the frame $a$ becomes so much demagnetized that it is no longer able to sustain the upper-carbon rod $d$, nor to hold the lower-carbon holder $l$ down against the pressure of the spring $i$. The result is that the upper-carbon holder descends by its gravity, and the lower-carbon holder is forced up by the spring $i$ until the carbons meet. The instantaneous full magnetization of the frame $a$ occurs, and the spring $i$ is again fully compressed by the drawing down of the lower-carbon holder $l$. The movements just described take place so smoothly as to be substantially imperceptible, and have no apparent effect on the steadiness of the light. They are continued until the carbons are consumed. The spring $i$ is very sensitive, and the whole device operates effectively, and requires but little attention.

In Fig. 10 I show a different form of spring, $i'$, and in Fig. 11 I show how it may be placed on top of the insulator $g$. Here the wire $n^3$ is insulated from the spring, either by embedding it more deeply in the insulating-flange $g'$ or otherwise. The spiral spring $i$ may be placed in this position, if desired.

In Fig. 12 I show how the spring $i$ may be applied to the upper-carbon rod. The holder $e$ is fastened to a sliding rod, $q$, placed in a hole, $d'$, in the lower end of the rod $d$, the stem $q'$ of which extends up into a smaller recess, $d^2$, in the rod $d$, and it is prevented from escaping therefrom by a pin or screw, $s$, extending through the side of the sleeve $b$ into the recess $q^2$, formed in the side of the rod $q$. The spring $i^2$ is inserted between the shoulder $q^3$ of the rod $q$ and the shoulder $d^3$ on the rod $d$, and encircles the stem $q'$. When the frame $a$ is demagnetized the rod $q$ is forced down by the spring, and when the circuit is closed by the meeting of the carbons the rod $q$ is drawn up by the attraction of the rod $d$, compressing the spring, separating the carbons, and establishing the arc. The feature of a movable rod for the upper-carbon rod will form part of the subject-matter of another application for patent, and is shown here only to illustrate the use of the spring with the upper-carbon holder.

If preferred, the wire $m^2$ only may be coiled around the frame $a$ to form the electro-magnet, and the other wire, $n^2$, may be connected directly to the lower-carbon holder or to its rod.

A case, $t$, extending up from the sleeve, $b$, covers and protects the upper-carbon rod.

My improved lamp is very simple and cheap in its construction, and operates automatically in feeding the carbons and in the establishment of the arc. The carbon-rods require but little attention, and it is unnecessary to polish them frequently, as is the case with many lamps now in use. The carbon-clamps are simple in construction and operate easily and quickly. The instantaneous establishment of the arc saves much unnecessary wasting of the carbon and contributes materially to the steadiness of the light.

The formation of the lamp-frame which sustains the carbon-holders of iron enables me to convert it into an electro-magnet by wrapping it with one or both circuit-wires, which constitutes the difference between it and the lamp shown in my Patent No. 234,261, in which the upper arm of the lamp only is an electro-magnet.

What I claim as my invention, and desire to secure by Letters Patent, is—

1. In an electric lamp, the combination of the core of an electro-magnet having a sleeve composed of two parts, the inner one of which is formed of iron and is the pole of the electro-magnet, and the outer one is of brass or other diamagnetic metal, substantially as and for the purposes described.

2. In an electric lamp, the combination of the core of an electro-magnet having a sleeve, an iron carbon-holder placed in such sleeve, and an adjustable friction device for regulating the friction of the holder in the sleeve, substantially as and for the purposes described.

3. An electric-lamp frame or bracket composed of iron and having vertical sleeves at its opposite ends, the bores of which are in the same axial line, for receiving the stems of the carbon-holders, substantially as and for the purposes described.

4. In an electric lamp, the combination of the carbon-holders with a frame composed of iron and wrapped with the circuit wire or wires, so as to be converted into an electro-magnet, substantially as and for the purposes described.

5. The combination of an iron carbon-holder, an electro-magnet capable of acting on said holder to attract it, and a spring acting on the holder in a reverse direction to that of the attraction of the magnet, substantially as and for the purposes described.

6. The combination of the lower sleeve of the lamp-frame, an insulating-tube placed in the bore of said sleeve, having a flange extending over the top of the sleeve and an inward flange at its lower end, the rod of the lower-carbon holder extending through said tube, and a spring bearing against the lower flange of the tube and sustaining the rod, substantially as and for the purposes described.

7. The combination of a recessed carbon-rod, capable of an axial movement, with an electric contact device, whereby the circuit of the lamp may be opened or closed, substantially as and for the purposes described.

8. The combination of an iron lamp-frame constituting the core of an electro-magnet, formed by wrapping it with one or both of the circuit-wires, the circuit-wires, one of which is connected to the frame and the other to the lower-carbon holder, and the lower-carbon holder insulated from the frame, substantially as and for the purposes described.

9. A carbon-clamp consisting of a tubular body, a loose segmental section, and an eccentric clamping collar or yoke encircling the same, substantially as and for the purposes described.

10. An upper-carbon clamp consisting of a tubular body, a loose segmental section, a lug extending from the segment into a recess in the tubular body, or vice versa, and a clamping collar or yoke encircling the same, substantially as and for the purposes described.

In testimony whereof I have hereunto set my hand this 29th day of April, A. D. 1882.

JOSEPH R. FINNEY.

Witnesses:
T. B. KERR,
JAMES H. PORTE.